United States Patent

Baron

[15] 3,635,737

[45] Jan. 18, 1972

[54] PARTICULATE CHEESELIKE COMPOSITIONS

[72] Inventor: Allen Baron, 187-D Mayhew Way, Walnut Creek, Calif. 94597

[22] Filed: Apr. 25, 1969

[21] Appl. No.: 819,422

[52] U.S. Cl. ..............................99/140 R, 99/115, 99/117, 99/144
[51] Int. Cl. ...................A23l 1/22, A23c 19/02, A23c 19/12
[58] Field of Search .................99/140 R, 144, 115, 116, 117

[56] References Cited

UNITED STATES PATENTS

| | | | |
|---|---|---|---|
| 2,683,665 | 7/1954 | Traisman et al. | 99/117 |
| 3,034,902 | 5/1962 | Davisotto | 99/140 R |
| 3,361,567 | 1/1968 | Engel et al. | 99/116 X |
| 3,499,769 | 3/1970 | Kratz et al. | 99/140 R |
| 3,520,699 | 7/1970 | Henning | 99/140 R |

FOREIGN PATENTS OR APPLICATIONS 1,127,281  9/1968  Great Britain..........................99/115

OTHER PUBLICATIONS

Chemicals Used in Food Processing; National Research Council; Publication 1274, Washington, D.C. 1965, pages 94, 134, 168 and 201.

Hall et al; Drying Milk and Milk Products; Avi Publishing Co. Westport, Connecticut, 1966; pp. 182– 184.

Merory, J; Food Flavorings; Composition Manufacture, and Use; Avi Publishing Co; Westport, Conn.; 1968, pp. 191– 192.

*Primary Examiner*—Morris O. Wolk
*Assistant Examiner*—Barry S. Richman
*Attorney*—Warren, Rubin, Brucker & Chickering

[57] ABSTRACT

Cheeselike solids are produced by incorporating a minor amount of one or more of the $C_4$–$C_8$ monocarboxylic aliphatic acids into dry casein coagulate. The novel product is a free flowing palatable food.

11 Claims, No Drawings

PARTICULATE CHEESELIKE COMPOSITIONS

This invention relates to novel nutritive compositions and to a process for their production. More particularly, it relates to a casein coagulate having cheeselike properties and a low-fat content. Still, more particularly, it relates to unique aromatic cheese substitutes.

BACKGROUND OF THE INVENTION

Flavorful foods such as Parmesan, Romano, Asiago, Blue, Roquefort and the like aromatic cheeses enjoy wide popularity and are consumed in large quantities. Certain disadvantages, however, are inherent in their use and production. Natural aromatic cheeses have in general a high-fat content and should be avoided where low-fat diets are desirable. In their production, long periods of time are required. Refrigeration is usually desirable or necessary for a satisfactory preservation of natural cheeses. Further disadvantages are marked variations in product quality, the presence of substantial amounts of undesirable rind, occasional unfortuitous and undesirable bacteria and/or mold contents and the like.

THE INVENTION

It has now been found that casein coagulate can be converted into a palatable cheeselike composition. In the process a minor amount of one or more of the $C_4$-$C_8$ aliphatic monocarboxylic acids is mixed with casein having particle sizes in the range 0.5 to 400 mesh. Provided that the water content of the mixture, based upon casein, is below 30–40 weight per cent, the mix has a good shelf life, i.e., no mold formation occurs in the absence of preservatives under ordinary ambient temperatures. The product is useful per se as a relatively neutral cheeselike base material, and by the addition of suitable flavorants and flavor enhancing agents, it is useful as a substitute for grated cheese.

Surprisingly, the incorporation of a minor amount of the aforementioned organic acid(s) into a substantially dry casein coagulate, and particularly, casein coagulate obtained from skim milk results in a composition having excellent food acceptability including such factors as appearance, mouth feel, flavor, and the like.

By substantially dry, as used herein, is meant a water content below about 10 weight per cent.

By casein coagulate, as used herein, is meant the solid(s) as obtained by the usual acid HCl lactic and the like acids) or enzymatic e.g., rennet and the like, treatment of milk wherein most, if not all, of the whey is removed.

By a minor amount of carboxylic acid, as used herein, is meant an amount sufficient to impart flavor e.g., based upon casein at least about 5 p.p.m.

In a preferred embodiment of the present invention a granulated cheeselike composition is produced from a casein coagulate having a 30–90 mesh particle size and a water content less than about 5 weight percent. In the process the casein is mixed at a temperature of 20°–50° C. with an aqueous mixture containing isovaleric, butyric, caproic, and succinic acids and sodium chloride. The casein is added portionwise to the aqueous medium and the latter is absorbed into the casein. Efficient stirring of the resulting mixture is continued until a substantially homogeneous mixture results, i.e., a total mixing time of 5–20 minutes yields a mix which for all practical purposes is homogeneous. For 100 parts (weight) of the casein, 9.6 parts of water containing 0.7 parts of succinic acid, $1.0 \times 10^{-3}$ parts of caproic acid and 4.3 parts of sodium chloride is employed. Preferably the succinic acid is in solution. The sodium chloride in powdered form is added to the succinic solution prior to the mixing with the casein. If desired, a trace of an antioxidant such as butylated hydroxyanesole plus butylated hydroxytoluene or the like may be added to the aqueous solution. Similarly, trace amounts of flavor enhancing agents such as disodium 5'-inosinate and 5'-guanylate or the like may also be added.

Satisfactory casein coagulate for use in the process of the instant invention should in general have based, upon casein, a water content below about 30–40 weight percent, and preferably less than about 20 weight percent. Where the water content is excessive, a number of unsatisfactory conditions are usually experienced, including an undesirable degree of plasticity of the casein during mixing, tendency of the particulate casein solid to lose its free flowing character and to compact, as well as to become susceptible to attack by mold(s) and the like. The substantially dry (less than 5-weight percent water) casein coagulates of commerce are especially useful in the practice of the present process because they are conveniently employable in the present water-casein slurry method for the incorporation of the required carboxylic acid into the casein. Casein coagulates obtained from skim milk are preferred for use herein because of their low natural fat contents.

The particle size of the casein coagulate may vary widely and yet be satisfactory for the practice of the process of the invention. In general the particle sizing (U.S. Standard Sieve) may be as small as 100 mesh or as large as 0.5 mesh and yet yield a useful product. Preferred casein coagulates for use herein have a particle sizing larger than about 350 mesh and smaller than about 4 mesh.

The water content of the novel compositions of the present invention should not exceed, as noted above, about 30–40 weight percent. Thus, where the casein is anhydrous for each 100 parts of casein not more than 30–40 parts of water should be used in the slurry method. Preferred amounts are in the range of 10 to 25 parts. Where the casein coagulate employed contains some absorbed water, correspondingly reduced amounts of water should be employed in the slurry process. On the other hand, the slurry technique is reasonably satisfactory where somewhat larger relative amounts of water are employed, i.e., up to about 60 weight percent. In this event, however, the water in excess of the 30–40 percent noted above must be removed by a suitable means such as oven drying, vacuum drying and the like but such is usually undesirable for reasons of cost.

The amount of the monocarboxylic acid which may satisfactorily be incorporated into the present compositions varies. At least about 5 parts per million parts of casein coagulate are required to impart a mild cheeselike flavor. Amounts of the acid in the range of 500 to 1,000 parts per million parts of casein coagulate yields products which are palatable and satisfactory. Larger relative amounts of these acids are usually undesirable. In general, the preferred amount of the acid(s) is in the range of 10 to 50 p.p.m.

The acids per se may be admixed with the casein coagulate; they may be added in a form from which the acids are readily available, i.e., in the form of their ammonium or alkali metal salts or as acid anhydrides (hydrolysis or reaction with water, respectively, yields the free acids). Combinations of the foregoing may also be employed to yield the required acid content.

The compositions herein may be produced in a dry mix operation, for example, by efficiently stirring as in a mechanical mixing unit casein coagulate and the required amount of the monocarboxylic acid. In the dry mix method, relatively long mixing times e.g., a period of 0.5 to 2 hours, are necessary to obtain a reasonably homogeneous mix. Better results are in general achievable by employment of an aqueous slurry system in which the components of the product including for each 100 parts of the casein coagulate from about 10 to 40 parts of water, from about $5 \times 10^{-4}$ to $1 \times 10^{-1}$ parts of the monocarboxylic acid together with salt and/or salt substitutes as desired are charged to the mixing unit and stirred efficiently until a substantially homogeneous mix is produced (usually 0.1 to 1 hour mixing time required). Best results, in general, are obtained when those components of the contemplated composition which are soluble in the water at a moderate temperature (i.e., below about 75° C.), are dissolved in the water charged to the mixing unit. Insoluble or partially soluble solids such as sodium chloride and the like in powdered form are subsequently charged to the mixer together with immiscible oils as desired. The casein coagulate is then added portionwise to the stirred mixture. Satisfactory mixing times, addition of casein plus postaddition stirring, are in general of the order of 5–30 minutes.

Representative carboxylic acids useful in the instant process includes butyric, isovaleric, valeric, cyclohexane carboxylic, hexanoic, 2-hexenoic, 5-methyl-4-heptenoic, iso-2-pentenoic, 3-butenoic, and the like aliphatic acids. The alkanoic acids containing four to six carbon atoms are preferred.

A number of functional additives are contemplated for use in the preparation of the instant cheeselike casein coagulate compositions including salt, sodium, or potassium chloride or caseinate and salt substitute compositions as used in low-salt diets, acidulation agents (for astringent effect) such as succinic acid, flavor enhancing agents such as disodium 5'-inosotate and/or 5'-disodium guanylate, monosodium glutamate, glutamic acid, and natural and/or synthetic fats and fatlike materials. In general, satisfactory effects are achieved when these additives are present in relatively small amounts e.g., based upon 100 parts of casein, for sodium chloride, less than 6 parts; for monosodium glutamate less than 10 parts; for glutamic acid less than 3 parts, for fats, natural and/or synthetic, less than 30 parts; for succinic acid less than 3 parts and preferably about 1 part.

While the invention is susceptable of considerable variation and modification in the manner of its practical application, particularly as regards the kind and proportions of the components and the method of procedure, the following examples will serve to illustrate some of the products falling within the invention and how they may be prepared.

EXAMPLE 1

Into a mechanical mixing unit were charged 40 grams of water at a temperature of about 25° C. containing 3.0 grams of succinic acid solute, 0.13 grams of disodium 5'-inosinate, 0.13 grams of disodium 5'-guanylate and in powdered ($\approx 200$ mesh) 18 grams of sodium chloride and 25 grams of monosodium glutamate. To the foregoing mixture was added with mixing 1.0 gram of a propylene glycol solution containing about $0.6 \times 10^{-2}$ grams of isovaleric acid and about $1.5 \times 10^{-2}$ grams of butyric acid. While the above charge was efficiently stirred, 415 grams of commercial casein coagulate (HCl precipitated from skim milk, having a water content of about 5 weight percent, a 30–90 mesh particle size, and a natural fat content below about 0.2 weight percent) were charged portionwise to the mixing unit. The initial portions were small, i.e., 1–10 percent of the total casein to be added and succeeding similarly small portions were added until the water phase appeared to be depleted at which time the balance of the casein was added. Stirring was continued and after 5 to 10 minutes thereof, the mixture was, for all practical purposes, homogeneous. The product had the appearance of an exceptionally pure grated cheese. It had an excellent mouth feel and the flavor of a good Italian Romano cheese. After more than one month's storage at ambient temperatures ($\approx 20$–$30°$ C.), there was no evidence of mold or bacterial action. The flavor remained excellent and, if anything, the mouth feel was better than initially.

EXAMPLE 2

When in the manner of example 1, about $2.0 \times 10^{-2}$ grams of a mixture of isovaleric, butyric, and caproic acids (weight ratio of 2:2:1 respectively) is substituted for the monocarboxylic acids of example 1 and about $0.8 \times 10^{-2}$ grams each of butyl butyryl lactate, and ethyl butyrate plus a trace of phellandrene, i.e., about $4 \times 10^{-4}$ grams are added, the resulting particulate casein composition has the flavor of blue cheese, an appetizing odor and appearance and an excellent mouth feel.

In a similar manner and using cheese flavoring mixtures as known in the art, nutritive, particulate, cheeselike compositions having good food acceptance can be readily and reproduceably produced. While the preferred embodiment of the invention is an essentially fat-free composition, e.g., based upon casein contains less than about 0.2 weight percent of fat, natural and/or artificial food grade fats are readily and substantially homogeneously distributed into the casein coagulate by the process of the invention.

As many apparent and widely different embodiments of this invention may be made without departing from the spirit thereof, it is to be understood that I do not limit myself to the foregoing examples or descriptions except as indicated in the following claims.

I claim:

1. The particulate, free-flowing cheeselike composition consisting essentially of a skim milk casein coagulate and an acid component comprising at least one acid of the formula $RCO_2H$ wherein R is an aliphatic hydrocarbon radical having a carbon atom content in the range of three to seven, said acid component being present in parts by weight per million parts of said casein in an amount in the range from about 5 to 1,000 parts, and said composition having in parts by weight a water content in the range from about 10 to 25 parts per 100 parts of the casein.

2. The composition as in claim 1 wherein the casein coagulate has a particle size in the range from about 0.5 to 400 mesh.

3. The composition as in claim 1 wherein the amount of the acid component is in the range from about 10 to 50 parts per million based on the casein content.

4. The composition as in claim 3 wherein succinic acid and sodium chloride are also present, and wherein for each 100 parts of the casein, less than about 3 parts of succinic acid and less than about 6 parts of sodium chloride are present.

5. The composition as in claim 1 wherein the casein has a particle size in the range from about 4 to 350 mesh and wherein said casein is produced from acid precipitated skim milk.

6. The composition as in claim 5 wherein said acids are alkanoic acids having a carbon atom content in the range of four to six, and wherein there is present for each 100 parts of the coagulate an amount of sodium chloride in the range from about 0 to 6 parts, an amount of monosodium glutamate in the range from about 0 to 10 parts and an amount of glutamic acid in the range from about 0 to 3 parts, the foregoing being in parts by weight.

7. The particulate, free-flowing cheeselike composition consisting essentially of casein coagulate obtained from skim milk, and of water, succinic acid, sodium chloride, monosodium glutamate, isovaleric, butyric, and caproic acids; said composition containing for each 100 parts of the casein about 10 parts water, about 1 part succinic acid, about $1.0 \times \times 10^{-3}$ part each of isovaleric and butyric acids, about 0.5 part of caproic acid, about 4 parts of sodium chloride, and about 6 parts of monosodium glutamate.

8. The process for the production of a particulate, free-flowing cheeselike composition which comprises mixing a substantially dry skim milk casein coagulate with an aqueous solution containing an acid component comprising at least one carboxylic acid of the formula $RCO_2H$ wherein R is an aliphatic hydrocarbon radical having a carbon atom content in the range of three to seven, said casein having a particle size in the range from about 0.5 to 400 mesh, said solution containing for each 100 parts by weight of the casein an amount of the acid component in the range $5 \times 10^{-4}$ to $1 \times 10^{-3}$ parts and an amount of water in the range from about 10 to 40 parts.

9. The process as in claim 8 wherein said water content is less than about 20 parts by weight per 100 parts by weight of casein.

10. The process as in claim 8 wherein the casein is added portionwise with stirring to the aqueous solution.

11. The process for the production of a particulate, free-flowing cheeselike composition which comprises forming a first slurry by adding powdered sodium chloride, powdered monosodium glutamate, isovaleric acid, butyric acid and caproic acid to an aqueous solution of succinic acid; thereafter forming a second slurry by adding substantially dry, particulate, skim milk, casein coagulate to said first slurry, said coagulate having a particle size in the range 30 to 90 mesh; completing the addition of the casein to the resulting mixture after the water phase has disappeared and continuing the mixing until the mixture is substantially homogeneous; wherein in parts by weight for each 100 parts of the casein, the relative proportions of the components are about 10 parts of water, about 1 parts of succinic acid, about $1.0 \times 10^{-3}$ part each isovaleric and butyric acid, about 0.5 part caproic acid, about 4 parts of sodium chloride, and about 6 parts of monosodium glutamate.

\* \* \* \* \*